US008180663B2

(12) United States Patent
Tischhauser et al.

(10) Patent No.: US 8,180,663 B2
(45) Date of Patent: May 15, 2012

(54) FACILITATING AUTOMATED MEETING SCHEDULING

(75) Inventors: Paul D. Tischhauser, Redmond, WA (US); David R. Reed, Seattle, WA (US); Jason C. Mayans, Bothell, WA (US); Michael A. Faoro, North Bend, WA (US); Brendan C. Fields, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1491 days.

(21) Appl. No.: 11/168,786

(22) Filed: Jun. 28, 2005

(65) Prior Publication Data

US 2006/0293943 A1 Dec. 28, 2006

(51) Int. Cl.
*G06F 15/02* (2006.01)
(52) U.S. Cl. ...................................... 705/7.19
(58) Field of Classification Search .............. 705/9, 7.19
See application file for complete search history.

(56) References Cited

U.S. PATENT DOCUMENTS

| | | | | |
|---|---|---|---|---|
| 4,977,520 A * | 12/1990 | McGaughey | ................. | 345/330 |
| 5,050,077 A * | 9/1991 | Vincent | ............................. | 705/8 |
| 5,774,867 A * | 6/1998 | Fitzpatrick et al. | ................ | 705/9 |
| 5,890,134 A * | 3/1999 | Fox | ................................... | 705/9 |
| 5,893,073 A * | 4/1999 | Kasso et al. | ...................... | 705/8 |
| 6,035,278 A * | 3/2000 | Mansour | ........................... | 705/9 |
| 6,085,166 A * | 7/2000 | Beckhardt et al. | ................ | 705/9 |
| 6,101,480 A * | 8/2000 | Conmy | ............................. | 705/9 |
| 6,216,110 B1 * | 4/2001 | Silverberg | ........................ | 705/9 |
| 6,781,920 B2 * | 8/2004 | Bates et al. | ....................... | 705/9 |
| 7,096,232 B2 * | 8/2006 | Doss et al. | ................. | 707/104.1 |
| 7,188,073 B1 * | 3/2007 | Tam et al. | .......................... | 705/9 |
| 7,283,970 B2 * | 10/2007 | Cragun et al. | ..................... | 705/8 |
| 7,343,313 B2 * | 3/2008 | Dorenbosch et al. | ............. | 705/8 |
| 7,395,221 B2 * | 7/2008 | Doss et al. | ........................ | 705/9 |
| 2001/0014866 A1 * | 8/2001 | Conmy et al. | ..................... | 705/9 |
| 2002/0152463 A1 * | 10/2002 | Dudkiewicz | .................... | 725/46 |
| 2003/0036941 A1 * | 2/2003 | Leska | ................................ | 705/9 |

(Continued)

FOREIGN PATENT DOCUMENTS

JP 07-121610 5/1995

(Continued)

OTHER PUBLICATIONS

Pino et al. "Scheduling Meetings Using Participants' Preferences." Information Technology & People, vol. 11, No. 2, p. 140, 1998.*

(Continued)

*Primary Examiner* — Susanna M Meinecke Diaz
(74) *Attorney, Agent, or Firm* — Workman Nydegger

(57) ABSTRACT

A computer-implemented method for assisting in the scheduling of a meeting. A user who desires to schedule a meeting simply inputs the relevant meeting parameters. In response, the computer evaluates a number of possible meeting times by comparing the input constraints against a predetermined set of suitability criteria. Based on this evaluation, the system identifies suggested meeting time(s), and also may identify rooms suitable for each meeting time. The system also calculates an estimated desirability for each suggested meeting time based on its compliance with the suitability criteria. The suggested meeting time(s) and a visual indicator of desirability for each time are then displayed. In addition, the raw free-busy data for each attendee may still be displayed. When the user selects a suggested meeting time, an electronic meeting request is automatically populated with the meeting time and a suitable place associated with the suggested meeting time.

17 Claims, 9 Drawing Sheets

U.S. PATENT DOCUMENTS

| | | | |
|---|---|---|---|
| 2003/0149606 A1* | 8/2003 | Cragun et al. | 705/8 |
| 2003/0204474 A1* | 10/2003 | Capek et al. | 705/64 |
| 2004/0064355 A1* | 4/2004 | Dorenbosch et al. | 705/9 |
| 2004/0093290 A1* | 5/2004 | Doss et al. | 705/35 |
| 2005/0202817 A1* | 9/2005 | Sudit | 455/433 |
| 2006/0072739 A1* | 4/2006 | Baggenstoss et al. | 379/265.05 |
| 2006/0167731 A1* | 7/2006 | Nishimura et al. | 705/8 |
| 2007/0021997 A1* | 1/2007 | Hayes et al. | 705/9 |
| 2007/0226035 A1* | 9/2007 | Doss et al. | 705/9 |
| 2008/0021760 A1* | 1/2008 | Doss et al. | 705/9 |

FOREIGN PATENT DOCUMENTS

| | | |
|---|---|---|
| JP | 10-207944 | 8/1998 |
| JP | 2002169939 | 6/2002 |
| JP | 2003256622 | 9/2003 |
| JP | 2004005652 | 1/2004 |
| JP | 2004295789 | 10/2004 |
| JP | 2005055964 | 3/2005 |
| WO | WO 0229647 A1 * | 4/2002 |

OTHER PUBLICATIONS

Boyer et al. "Introduction to the Special Issue on 'Service Strategy and Technology Application'." Production and Operations Management, vol. 13, No. 3, Fall 2004, pp. 201-204.*

International Search Report dated Aug. 15, 2007 for Application No. PCT/US 06/15333, 8 pages.

* cited by examiner

| Appointment | Find time and place |

800

To... Abraham Audown; Bill Beckstead; Casper Chaple; Doug Draper

Subject: Review quarterly projections

Location: Cascade ▸ ☐ None

Start Time: Mon 5/8/2006 ▸ 10:00 AM ▸
End Time: Mon 5/8/2006 ▸ 12:00 PM ▸ ☐ All day event ☑ Reminder: 15 minutes ▸ 🕮 Show time as: ■ Busy ▸

Meeting Workspace... ☐ This is an online meeting using: ▸

Contacts... Categories... ☐ Private

*Fig. 8*

FACILITATING AUTOMATED MEETING SCHEDULING

BACKGROUND OF THE INVENTION

The ability to meet together is an essential need of human beings. People meet for a variety of reasons such as collaboration on a project, collective education, entertainment, relationship renewal, and so forth. Regardless of the reason for the meeting, the scheduling of a meeting involves the consideration of several key considerations. For instance, key meeting parameters may include the desired attendees, the availability of each attendee, whether each attendee is mandatory or optional, the desired duration of the meeting, a desired date range for the meeting, whether there is a suitable meeting place available with suitable equipment, and the like.

Traditionally, the scheduling of meetings was done manually. For meetings with a large number of participants, at least some of which being quite busy, the manual scheduling of meeting may involve hours or even days of administrative time. Fortunately, a variety of electronic calendaring programs have been developed that allow for more computer-facilitated scheduling of meetings.

One model of electronic meeting scheduling involves the selection of attendees for the meeting. Then, free and busy data for each attendee is displayed to the user. The user may then scan through potential meeting times until the user finds a time when all or most of the attendees are available. The user can then generate an electronic meeting request, fill in the desired time for the meeting, and send the electronic meeting request to the desired attendees. If a room and/or equipment is needed for the meeting, the user can navigate through the available rooms to evaluate the availability of the rooms as well. It can take some training to learn how to schedule rooms using conventional electronic calendaring programs.

Even with this electronic help, however, the user still has the task to scan through the raw free and busy data to find a suitable time. This can take significant time. In some electronic calendaring programs, there is a helpful feature that allows for the user to identify the attendees and duration of a meeting, then automatically navigate forward or backwards through time to find the next time that all of the attendees will be available. However, the use of this feature also can take some training or user research. Furthermore, this tool is often too restrictive by limiting times to those in which all attendees are available, even though it may be acceptable if not all of the even required attendees are in attendance. The user wants to find the appropriate balance between finding a soon enough time to meet with maximizing the number of people who can actually attend the meeting; however, current tools focus only on maximizing the number of attendees.

BRIEF SUMMARY OF THE INVENTION

The principles of the present invention relate to a computer-implemented method for assisting in the scheduling of a meeting. A user who desires to schedule a meeting simply inputs the relevant meeting parameters into the computing system such as, for example, the attendees, possible meeting places, duration and possible dates.

In response, the computing system automatically evaluates a number of possible meeting times by comparing the input constraints against a predetermined set of suitability criteria. Such suitability criteria may include, for example, the number of required/optional attendees with a conflict, the extent of conflict, the availability of a location to meet, and the like. Based on this evaluation, the computing system automatically identifies one or more suggested meeting times, and also may identify rooms suitable for each meeting time. The suggested meeting times need not be free of conflicts, but are the best options chosen by the computing system given the input constraints and suitability criteria. The computing system also calculates an estimated desirability for each suggested meeting time based on its compliance with the suitability criteria.

The results of the evaluation including the suggested meeting time(s) and a visual indicator of desirability for each suggested meeting time are then displayed. In addition, the raw free-busy data for each attendee may still be displayed. When the user selects a suggested meeting time, an electronic meeting request is automatically populated with the meeting time and a suitable place associated with the suggested meeting time.

Accordingly, the user need not manually make a determination on the best time and place to meet solely based on raw data. Instead, the user is provided additional information resulting from computer-generated suggestions, thereby saving the user time. Additionally, the generation of the electronic meeting request is fairly straightforward, and may be generated by simply choosing a suggested meeting time. Finally, the user is allowed to continue working with the raw free busy data should the user choose to exercise a higher level of control over the selected meeting time.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 3 illustrates a user interface that may be displayed to allow a user to enter meeting constraints;

FIG. 4 illustrates a user interface that may be displayed to allow a user to select attendees for the meeting;

FIG. 5 illustrates a user interface that may be displayed to allow a user to select rooms for the meeting;

FIG. 6 illustrates a user interface that may be displayed to a user after the attendees and rooms have been selected;

FIG. 8 illustrates a user interface in which an electronic meeting request may be automatically populated with information from the selection of a meeting time in FIG. 7.

DETAILED DESCRIPTION OF THE PREFERRED EMBODIMENTS

Figure 1:
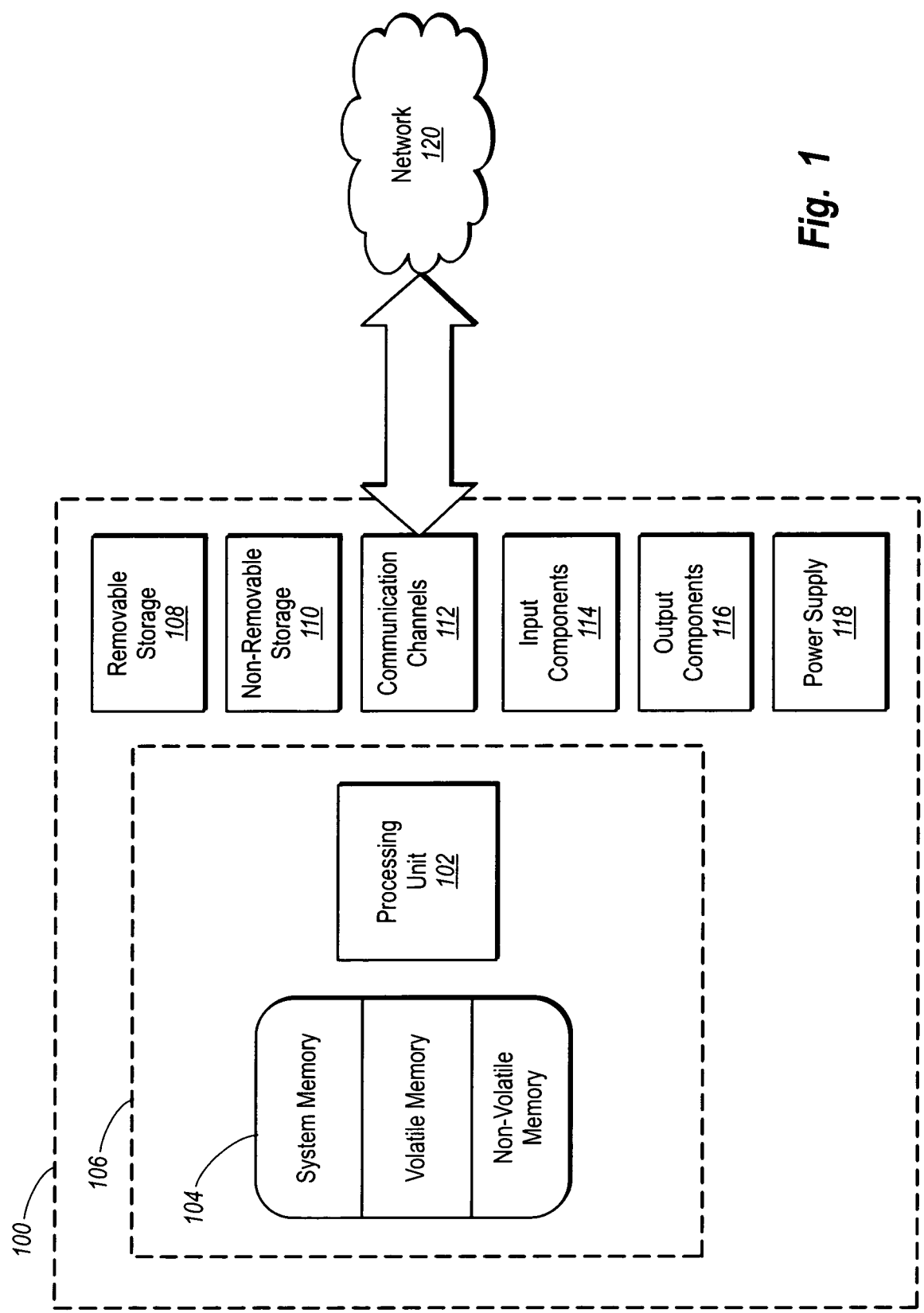
FIG. 1 illustrates a suitable computing system that may implement features of the present invention.

The principles of the present invention related to a computer-implemented method for assisting in the scheduling of a meeting. A user who desires to schedule a meeting simply inputs the relevant meeting parameters into the computing system. In response, the computing system automatically evaluates a number of possible meeting times by comparing the input constraints against a predetermined set of suitability criteria. Based on this evaluation, the computing system automatically identifies one or more suggested meeting times based on the evaluation, and also may identify rooms suitable for each meeting time. The computing system also calculates an estimated desirability for each suggested meeting time based on its compliance with the suitability criteria.

The results of the evaluation (including the suggested meeting time(s) and a visual indicator of desirability for each suggested meeting time) are then displayed. The raw free-busy data for each attendee may still be displayed, but the computer-generated suggestions for suitable meeting times is provided as a tool for the user to allow the user to avoid sifting through the raw data should the user choose instead to take the suggestions of the computing system. When the user selects a suggested meeting time, an electronic meeting request is automatically populated with the meeting time and a suitable place associated with the suggested meeting time.

Prior to describing the details of the principles of the present invention, a suitable computing system that may be used to implement the principles of the present invention will be described with respect to FIG. 1. In the description that follows, embodiments of the invention are described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the principles of the invention are being described in the foregoing context, it is not meant to be limiting as those of skill in the art will appreciate that several of the acts and operations described hereinafter may also be implemented in hardware.

Turning to the drawings, wherein like reference numerals refer to like elements, the principles of the present invention are illustrated as being implemented in a suitable computing environment. The following description is based on illustrated embodiments of the invention and should not be taken as limiting the invention with regard to alternative embodiments that are not explicitly described herein.

FIG. 1 shows a schematic diagram of an example computer system. For descriptive purposes, the architecture portrayed is only one example of a suitable environment and is not intended to suggest any limitation as to the scope of use or functionality of the invention. Neither should the subsequently described and/or claimed computing systems be interpreted as having any dependency or requirement relating to any one or combination of components illustrated in FIG. 1.

The principles of the present invention are operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106. In this description and in the claims, a "computing system" is defined as any hardware component or combination of hardware components capable of executing software, firmware or microcode to perform a function. The computing system may even be distributed to accomplish a distributed function. The computing system may encompass multiple computing systems that each separately satisfies this definition.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated. In this description, a "computing entity" may be any computing system as previously defined herein, or any module or combination of modules running on a computing system.

Computing system 100 may also contain communication channels 112 that allow the host to communicate with other systems and devices over, for example, network 120. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length here.

Figure 2A:
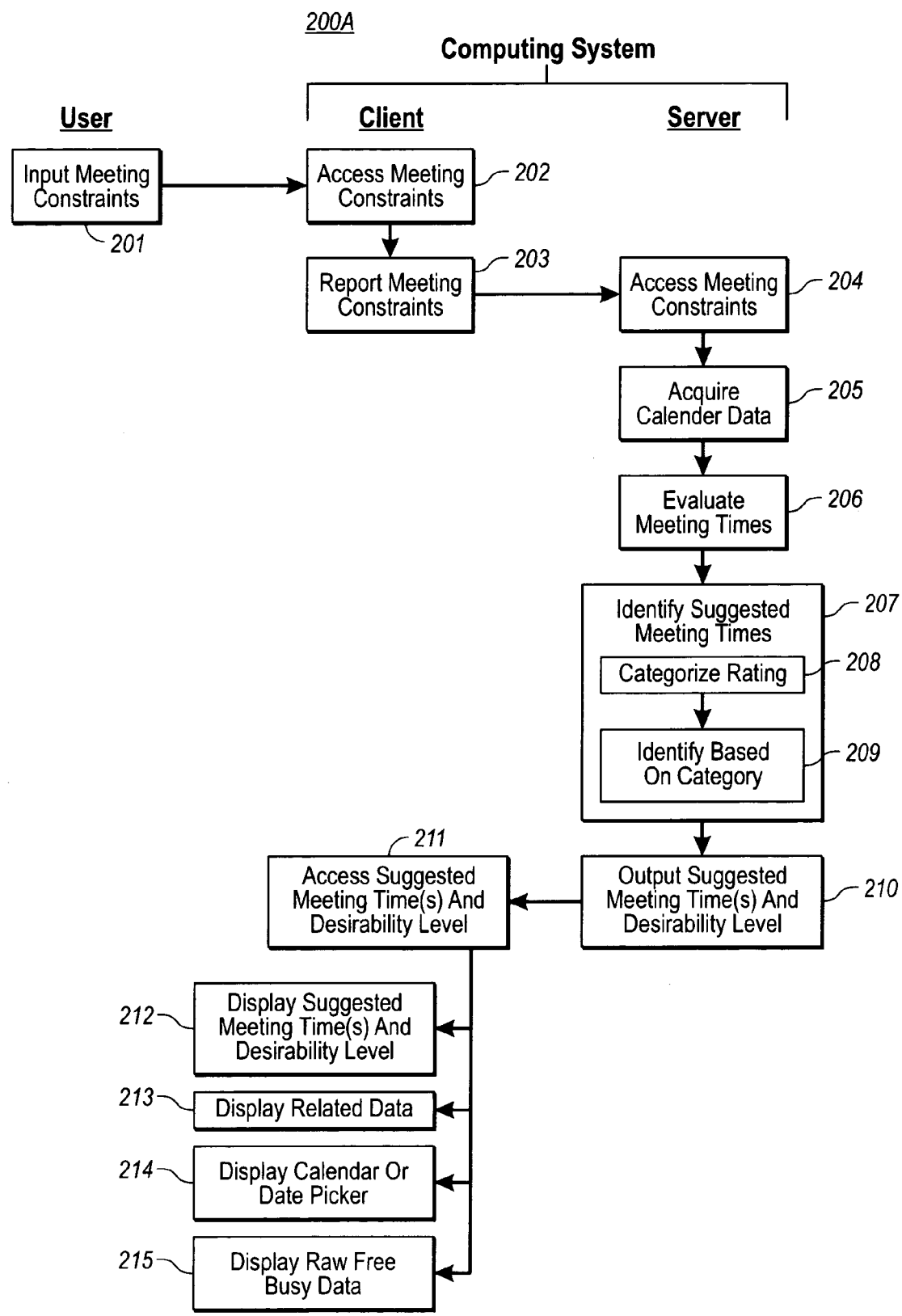
FIG. 2A illustrates a flowchart of a computer-implemented method for assisting in the scheduling of a meeting in accordance with the principles of the present invention.

FIG. 2A illustrates a flowchart of a computer-implemented method 200A for assisting in the scheduling of a meeting. Some of the acts are performed by a user and are displayed in the left column of FIG. 2A under the header "User". In this case, suppose the user is the one who desires to schedule a meeting. Other acts are performed by a computing system as represented to the right of the left column under the bracketed header "Computing System". While the acts shown under the heading "Computing System" may be performed by a single computing system, the computing system may be distributed between a computing system (referring to herein as a "client") that interfaces with the user and another computing system (referred to herein as a "server") that provides calendaring services to the client. In that case, those acts that may be performed the client are listed in the middle column under the header "Client", while those acts that may be performed by the server are listed in the right column under the header "Server".

In one embodiment, the process is initiated when a user desires to schedule a meeting. The user inputs into the client desired constraints or parameters for the meeting (act 201). Such parameters may include, for example, the identity of the attendees, possible meeting rooms, resources needed, whether the attendees are mandatory or optional, the duration of the meeting, a desired time date(s) for a meeting, and the like.

Figure 3:
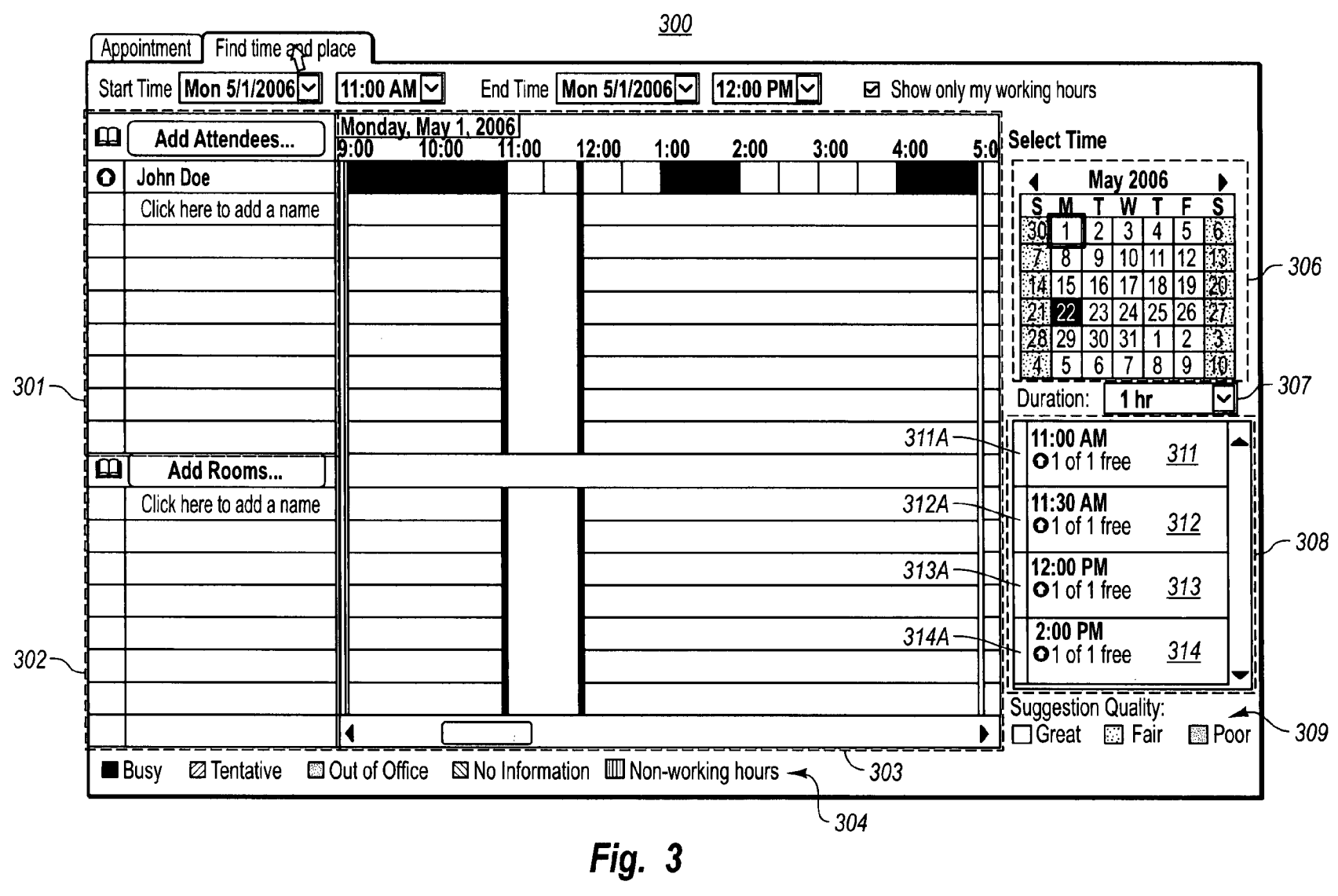

FIG. 3 illustrates a user interface 300 that may be displayed on the client and viewed by the user to allow the user to enter such meeting constraints. The user may use the "Add Attendees" frame 301 to add attendees to the meeting. In FIG. 3, the user has not yet entered any attendees. The user, himself, (here named "John Doe") has been automatically added as an attendee though he may be deleted if desired. The attendees may be gathered from a global or local contact list that may be displayed once the "Add Attendees . . . " button is selected.

Figure 4:
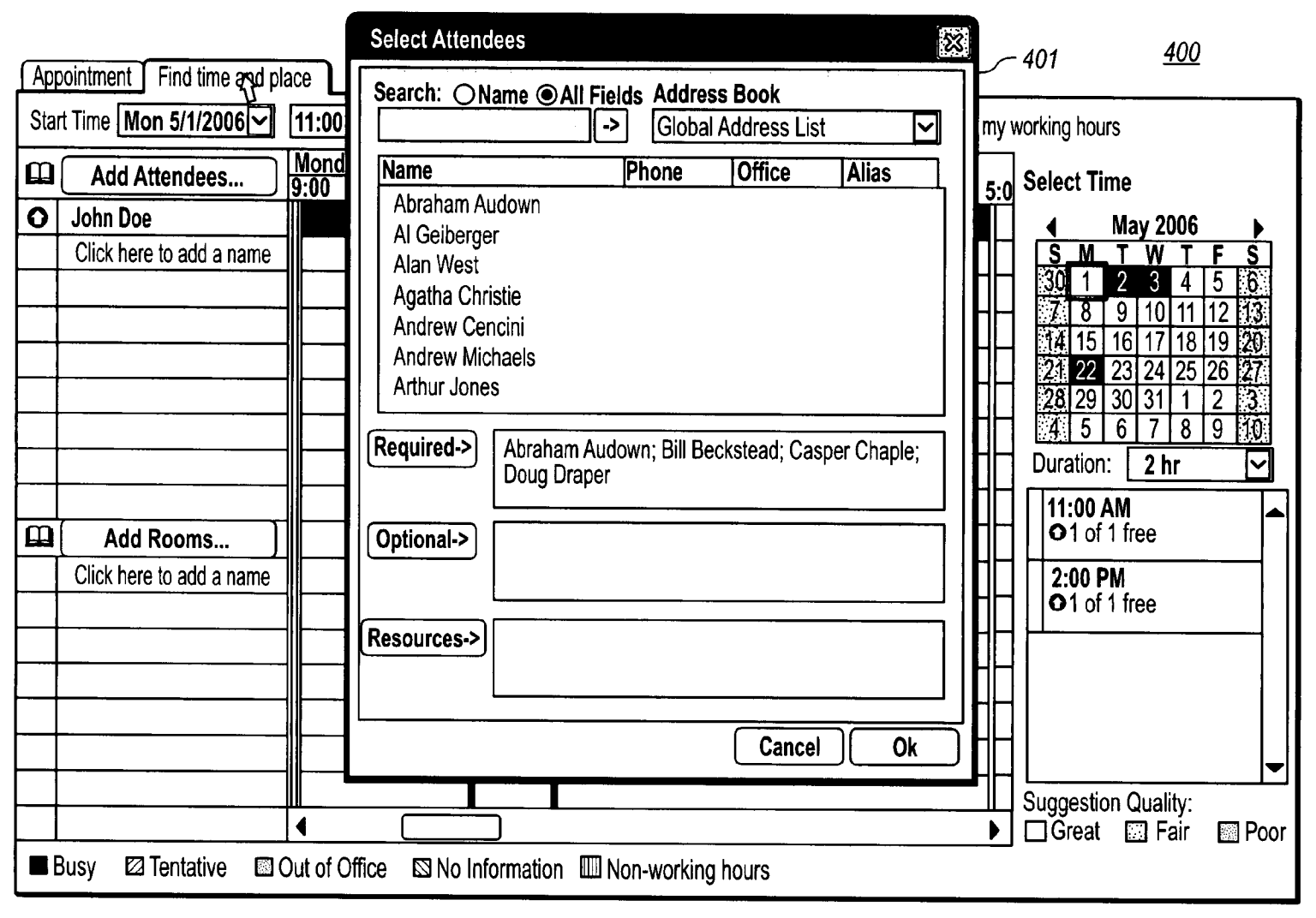

For instance, if the user selects the "Add Attendees" button of FIG. 3, the user interface 400 of FIG. 4 may appear in which a "Select Attendees" window 401 appears. The user has selected four more attendees for the meeting. In our example, these attendees are named "Abraham Audown", "Bill Beckstead", "Casper Chaple" and "Doug Draper".

The user may use the "Add Rooms" frame 302 to add possible rooms for the meeting. There may also be a rooms selection list that is displayed once the user selects the "Add Rooms . . . " button. The rooms lists may also be searchable, and may list the equipment available in each room. The room list may also include other resources such as a list of mobile equipment that is not necessarily associated with a room, and that may be reserved.

For instance, suppose that the four attendees are selected in FIG. 4, and that the "Add Rooms . . . " button is then selected. In that case, the user interface 500 of FIG. 5 would appear including a "Select Rooms" window 501. In our example, the user desires to find any room with projection capabilities in Building 34. Accordingly, the user enters "34 Projection" in the search field 502 resulting in just two possible rooms called "Cascade" and "Rainier". The user selects the two rooms and adds them to the rooms list.

Returning to FIG. 3, the user may use the date picker frame 306 to select a date or a date range that the user would like the meeting to take place in. In this example, a single day is initially selected, May 1, 2006. As will be explained hereinafter, the date picker frame 206 is not only used for navigating through a free busy grid, but will also include visual indicators that represent levels of suitability of the day given the calendar constraints of the attendees, rooms, and other resources.

The user may use the duration drop down list control 307 to select a duration for the meeting. At this state, the control 307 shows an initial duration of 1 hour, but that duration may be changed at will by the user.

The user interface also includes a free busy grid frame 303 that may be updated to show the calendar state for each attendee and for each time period. In this case, May 1, 2006 is shown since that is the date picked in the date picker frame 306. Furthermore, only the schedule for John Doe is shown since, at that point, John Doe was the only selected attendee. The remaining portions of the user interface will be described subsequently.

Returning, for the time being, to FIG. 2A, the computing system (the client in the case of a distributed environment) accesses the user-entered meeting constraints (act 202). If a distributed environment, the client may report the user-entered meeting constraints to the server (act 203), whereupon the server accesses the user-entered meeting constraints (act 204). Alternatively, if the client has access to the calendar data for the attendees, rooms, and resources, and is capable of performing the evaluation of the calendar data described herein, the client may forgo communication with the server for the remainder of the method 200. If the client was capable of performing the evaluation, but needed the server to access the calendar data for the attendees and resources, the client could instead request the calendar data and perform the evaluation itself after receiving the calendar data.

Upon receiving the meeting criteria or the request for calendar data from the client (act 204), the server then acquires the calendar data for the attendees, rooms, and resources (act 205). Then, the server either returns the calendar data to the client, or performs an automated evaluation of multiple possible meeting times using the meeting criteria compared against a predetermined set of suitability criteria (act 206). In this description and in the claims, "suitability criteria" includes any criteria relevant to whether or not a particular time for a meeting is a desirable time given the meeting constraints. Examples of suitability criteria include the number or fraction of required attendees who have a conflict with the particular time; whether the conflict is due to a tentative appointment, a busy entry, or an out of office entry; whether the conflict is only a partial conflict (with the conflicting appointment being only during a portion of the particular time); the number of rooms available; whether any other requested resources are available, the number of optional attendees having a conflict; whether the particular time begins on the hour, on the half hour, or on a 15 minutes before or after the hour mark; whether the particular time is partially or totally out of normal working hours, and so forth.

The evaluation may involve calculating a rating for each of the possible meeting times as a function of the predetermined set of suitability criteria. An example of such a rating calculation will be give below with respect to a specific algorithm that may be used for the evaluation.

The server (or the client if the client performed the evaluation) then identifies suggested meeting time(s) based on the evaluation (act 207). If the evaluation resulted in ratings being calculated, this identification may be based on which of the possible meeting times had the rating more indicative of a suitable meeting time. In one embodiment, the identification is performed by categorizing the possible meeting times into one of a number of categorizations (act 208—first act in act 207)), and then identifying the suggested meeting times based on their categorization (act 209—second act in act 207).

Although the automated evaluation and identification of the suggested meeting times may be accomplished using a number of different techniques, one very specific method will now be described. The specific method receives as input the meeting constraints as generally described with respect to act 204.

The following is an example Application Program Interface (API) in which a calling application (e.g., "Client" in FIG. 2A) provides the input meeting constraints to an evaluation service (e.g., "Server" in FIG. 2A) that performs the specific method.

```
DayResult[ ] GetSuggestionsByDateRange(
    DateTime startDate,
    DateTime endDate,
    int inputMeetingDuration,        // minutes
    AttendeeData[ ] Attendees);
```

In this API, the calling application specifically provides the time window in which the meeting might occur (starting at startDate and ending at endDate), provides the meeting duration, and the identification of the desired attendees. The time window may be restricted to no more than a certain length in order to avoid unnecessary processing.

The GetSuggestionsByDateRange interface returns an array of DayResult objects, one for each day in the time window. The following is an example class declaration for such a DayResult object:

```
class DayResult
    DateTime Date { get; }
    IEnumerable<MeetingSuggestion> MeetingSuggestions { get; }
```

Each DayResult object in the array contains an ordered collection (from best to worst) of MeetingSuggestion objects for the corresponding day. The best-rated suggestion on a given day will be the first MeetingSuggestion in the MeetingSuggestions collection. The category assigned to this most optimal suggestion in a given day will determine the color of the day in the calendar control 306. The following is a class declaration of an example MeetingSuggestion class:

```
class MeetingSuggestion
    DateTime Start { get; }
    double TimeSlotRating { get; }
    SuggestionBucket Bucket { get; }
    int RequiredAttendeeConflictCount { get; }
    int OptionalAttendeeConflictCount { get; }
    int ResourceAttendeeConflictCount { get; }
    int RoomsAvailableCount { get; }
    AttendeeConflictData GetAttendeeConflictData (int attendeeIndex);
```

Each meeting suggestion includes a DateTime field that represents the date and time of the beginning of the proposed meeting time. The end of the proposed meeting time may be inferred from the duration of the meeting passed to the evaluation service as part of the user input. The TimeSlotRating field is the calculated rating for the meeting, with lower ratings suggested more suitable meeting times. The SuggestionBucket field represents the suggested category of the meeting time (e.g., Excellent, Good, Fair, or Poor) that is derived based on the rating. The RequiredAttendeeConflictCount, the OptionalAttendeeConflictCount, ResourceAttendeeConflictCount, and the RoomAvailableCount fields are fairly self descriptive, and define the number of required attendees with a conflict with the proposed meeting time, the number of optional attendees with a conflict with the proposed meeting time, the number of resource attendees with a conflict with the proposed meeting time, and the number of rooms available for the meeting time.

The AttendeeConflictData object includes a method called GetAttendeeConflictData (int attendeeIndex), in which an identifier of the attendee may be provided to the object to return a number of different pieces of information regarding conflicts associated with the attendee. For instance, the AttendeeConflictData class may be defined as follows:

```
class AttendeeConflictData
    AttendeeData Identity { get; }
    bool AttendeeHasConflict { get; }
    bool IsWorkTime { get; }
    bool IsMissingFreeBusyData { get; }
```

The fields describe the identifier for the attendee, whether or not the attendee has a conflict with the meeting time, whether or not the meeting time is during the attendee's work time, and whether or not there is missing free busy data for the attendee.

Before calculating the suitability of each meeting time, the evaluation service also accesses the calendar data for each of the identified attendees as generally described with respect to act 205. In one embodiment, the calendar data is merged into a single data structure for more convenient analysis.

Given the user input, and the free busy data for each attendee, a rating may be calculated for each meeting time, where the lower the rating, the generally more suitable is the meeting time given the input constraints and the free busy calendar information for each attendee. The following describes an example of how the rating may be calculated.

Ratings may be computed by assigning each factor below a set of bits in an integer. The most important factor sets the highest order bits while the least important factor sets the lowest order bits.

Required attendee conflicts
Room/Resource attendee conflicts
Work hours
Optional attendees
Time preferences For highest bits of significance in the rating, the bits are computed by generating a sum of weighted required attendee conflicts. If there is a complete conflict for a required attendee (e.g., the required attendee is not listed as free during any portion of the meeting, and the non-free time that conflicts with the meeting time is characterized as busy, or out of office), then the required attendee conflict has a full count of 1. However, if there is less than a full conflict, then the required attendee conflict is weighted. Specifically, for each required attendee who has a conflict with the meeting time, the count is weighted by duration ($w_d$), which is essentially a "conflict overlap" normalized to 1. For example, if a required attendee has a conflicting appointment for 15 minutes of a one hour time slot, then $w_d=0.25$. If the conflict is 30 minutes, then $w_d=0.50$. Also, the count is weighted by the free busy status ($w_{fb}$), where tentative conflicts are less heavily weighted than busy or out of office (aka oof or unavailable) conflicts. For instance, if there is only a tentative conflict, $w_{fb}=0.5$. If the conflict is busy time or oof time, then $w_{fb}=1.0$.

The sum of these weighted conflicts is computed. For instance, suppose that N is the number of required attendee conflicts. The sum would then be defined by the following equation 1:

$$\text{Sum weighted conflicts} = \sum_{i=1}^{N} (w_d)_i (w_{fb})_i \quad (1)$$

The more significant bits are then computed by taking the binary representation of the nearest integer to the sum of the weighted conflicts. If there are a maximum of 100 required attendee conflicts, then 7 bits is sufficient to represent this sum. In one embodiment, bits 62 through 56 in a 64 bit representation of the rating represent this sum.

The next 3 bits are calculating using the strongest required attendee conflict. For instance, if the strongest conflict amongst required attendees is "out of office", then that would be a 3 (expressed as 011 in binary). If the strongest conflict is "busy", then that would be a 2 (expressed as 010 in binary). If the strongest conflict is "tentative", then that would be a 1 (expressed as 001 in binary). If there were no required attendee conflicts, then that would be a 0 (expressed as 000 in binary). In the example 64 bit representation of the rating, these 3 bits may correspond to bits 55 through 53.

The next 7 bits (e.g., bits 52 to 46 in the example) are a representation of the minimum percentage of front time (normalized to one hundred) expressed as $(1-t_{front}/\text{duration})$, where $t_{front}$ is the minimum front time. The 7 bits after that (e.g., bits 45 to 39 in the example) are representations of the total percentage of front time (normalized to one hundred).

For example, suppose that for a two hour meeting time, there are three required attendees; one having no conflict, and two are available for the first one and a half hours, but not for the last half hour. In that case, the minimum front time would be 1−(1.5 hours/2 hours), which would be 25%, normalized to one hundred is 25, which would result in a 7 bit binary representation of 0011001. On the other hand, the total front time expressed as a percentage would be 1−(((1.5 hours+1.5 hours+2 hours)/3)/2 hours), which equals 16.667%, normalized to one hundred would be 17, and represented in binary as 0010001.

In another example, suppose that for a two hour meeting, there are once again three required attendees; one having no conflict, and one available only for the first one and a half hours. The third is available for the first half hour, but not for the second half hour, is once again available for the third half hour, but is not available for the fourth half hour. In that case, the minimum front time would be 1−(0.5 hours/2 hours), which would be 75%, normalized to one hundred is 75, which would result in a 7 bit binary representation of 1001011. The total front time expressed as a percentage would be 1−(((2 hours+1.5 hours+0.5 hour)/3)/2 hours), which equals 33.33%, which normalizes to one hundred would be 33, and represented in binary as 0100001.

The next bit (e.g., bit 38 in the example) represents whether or not there is a room available for the meeting time. If there is a room available, the bit has value 0, and otherwise has value 1.

The next 7 bits (e.g., bits 37 to 31 in the example) represent a maximum inconvenience value for all required attendees and is a function of when the meeting time is compared to the normal work hours for the attendee. The inconvenience factor may have a value ranging from 0 to 84. A 0 value means that the meeting time is completely within the work hours for the attendee. A 1 value means that the meeting time begins one hour before the closest work hours, or ends 1 hour after the closest work hours. Generally speaking, an N for an inconvenience value means that the meeting time begins N hours before the closest work hours, or ends N hours after the closest work hours. Since there are 168 total hours in one week, and assuming that the attendee has at least some weekly work hours, the maximum value of N may be 84. Once the inconvenience factor is calculated for each required attendees, the maximum inconvenience factor for any of the required attendees is then assigned to the next 7 bits.

The next 7 bits (e.g., bits 30 to 24) represent the total inconvenience factor across all required attendees, perhaps normalized to one hundred. For example, if there were three required attendees having inconvenience factors 0, 10 and 50, the total inconvenience factor would be 60 out of a possible 252 (i.e., 3×84), which is 23.8%, which normalized over one hundred equals 24.

The next 7 bits (e.g., bits 23 to 17) represent a strict count of the number of optional attendees with any sort of conflict (e.g. partial or full; and tentative, busy, or oof). If the maximum number of optional attendee conflicts is one hundred, this may be represented using 7 bits.

The next 3 bits (e.g., bits 16 to 14 in the example) are calculated using the strongest optional attendee conflict. For instance, if the strongest conflict amongst optional attendees is "out of office", then that would be a 3 (expressed as 011 in binary). If the strongest conflict is "busy", then that would be a 2 (expressed as 010 in binary). If the strongest conflict is "tentative", then that would be a 1 (expressed as 001 in binary). If there were no optional attendee conflict, then that would be a 0 (expressed as 000 in binary).

The next 7 bits (e.g., bits 13 to 7 in the example) represent the total percentage of optional attendee conflict overlap, normalized to one hundred. For example, if optional Attendee A conflicts overlaps half of the meeting time, optional Attendee B conflicts overlap 25% of the meeting, and optional Attendee C conflicts overlap all of the time slot, the total optional conflict overlap is (50+25+100)/3=58.33%, which normalizes over one hundred to 58.

The next 2 bits (e.g., bits 6 and 5 in the example) represent the time preference for the start of the meeting. For instance, times starting one the hour (e.g., 1:00 pm, 2:00 pm) may have a time preference of 0, times starting on the half hour (e.g., 1:30 pm, 2:30 pm) may have a time preference of 1, and times starting on the 15 minute boundary (e.g., 1:15 pm, 1:45 pm, 2:15 pm, 2:45 pm) may have a time preference of 2. In some cases, having such a time preference may result in meeting time orderings that are not intuitive or attractive visually to a user. In that case, these time preference bits may simply be not calculated or ignored.

The final bits may represent the time of day that the meeting is to start, with earlier times being assigned lower numbers.

In addition to rating the meeting suggestions, some meeting suggestions may be filtered. For instance, a default or user entered configuration setting may cause meeting suggestions that are outside of the meeting organizers work times to be filtered out. In addition, meeting suggestions of a certain category or rating range (e.g., "poor" meeting suggestions) may be filtered out. In addition, meeting suggestions in which there are more than one required attendee conflict may be filtered out.

Once the ratings are calculated, they may be used to assign the meeting suggestion into a category. In one embodiment, there are four categories, "excellent", "good", "fair" and "poor". Those categorizations may be based largely on the percentage of required attendees with conflicts. If there are no required attendee conflicts and the meeting time is within the work hours of all required attendees, that meeting suggestion may be automatically characterized as "excellent". If more than a certain percentage of required attendees have a conflict (e.g., 50%), then that meeting suggestion may be characterized as poor. For those remaining meeting suggestions, those that have required attendee conflict percentages that are above a certain threshold (e.g., 25% by default, but configurable), may be categorized as "good", and those that fall below the threshold may be categorized as "fair". Within each category, the meeting suggestions may be further sorted by their rating.

Regardless of how the suggested meeting times are determined, the server or the client then outputs the suggested meeting time(s) with an indication of suggested desirability for each of the plurality of suggested meeting times (act 210). This may be related to the rating or categorization mentioned above, and may include some of the factors used to calculate the rating such as, for example, the number of conflicts associated with the suggested meeting time, the number of rooms available for the suggested meeting time, of the like. If the server performed the evaluation, the act of outputting may include providing the suggested meeting times to the client. If the client performed the evaluation, the act of outputting may involve passing the suggested meeting times to software outside of the evaluation object.

The client (or an appropriate component therein) then accesses the suggested meeting time(s) for the meeting, and an indication of suggested desirability for each of the suggested meeting times (act 211). The client then causes the display to display an identification of a time for each of at least some of the suggested meeting times, along with a visual indicator representing the suggested desirability for each of the displayed suggested meeting times (act 212). The related data such as the number of conflicts associated with the suggested meeting time, and the number of rooms available for the suggested meeting time may also be displayed (act 213).

At the same time as the suggested meeting times are displayed, the client may also cause a calendar or date picker object to be displayed (act 214). The calendar may include a visual indicator for each date, the indicator representing a relative suitability of each day for the desired meeting. At the same time, or even prior to the evaluation, the raw free busy data may be displayed for each of the attendees, rooms, and resources requested for the meeting (act 215).

Returning to FIG. 3, a suggested meeting times frame 308 includes an identification of suggested meeting times 311 through 314 generated according to the method 200 of FIG. 2. Each suggested meeting time includes an identification of desirability or suitability. This is shown for each suggested meeting time as the left vertical stripe (see indicator 311A through 314A associated with suggested meeting times 311 through 314, respectively). Referring to the legend 309, all of the suggested meeting times are categorized as "great". Furthermore, each suggested meeting time indicates that the one requested attendee is available (i.e., "1 of 1 free").

Each day of the date picker object also includes a visual indicator showing the suitability of each day for the suggested meeting. In this case, all of the days except for May 22, 2006 are white. Accordingly, referring to legend 309, any day would be great for the meeting, except for May 22, 2006, which is poor for the meeting. Here, since May 1, 2006 is selected, the suggested meeting times are for May 1, 2006.

In the example of FIG. 3, there was just one required attendee, who was mostly free during the month. Accordingly, it would have been quite easy to schedule the meeting, even without the assistance of software. However, as the number of required attendees increases, the meetings can get quite complex.

Figure 5:
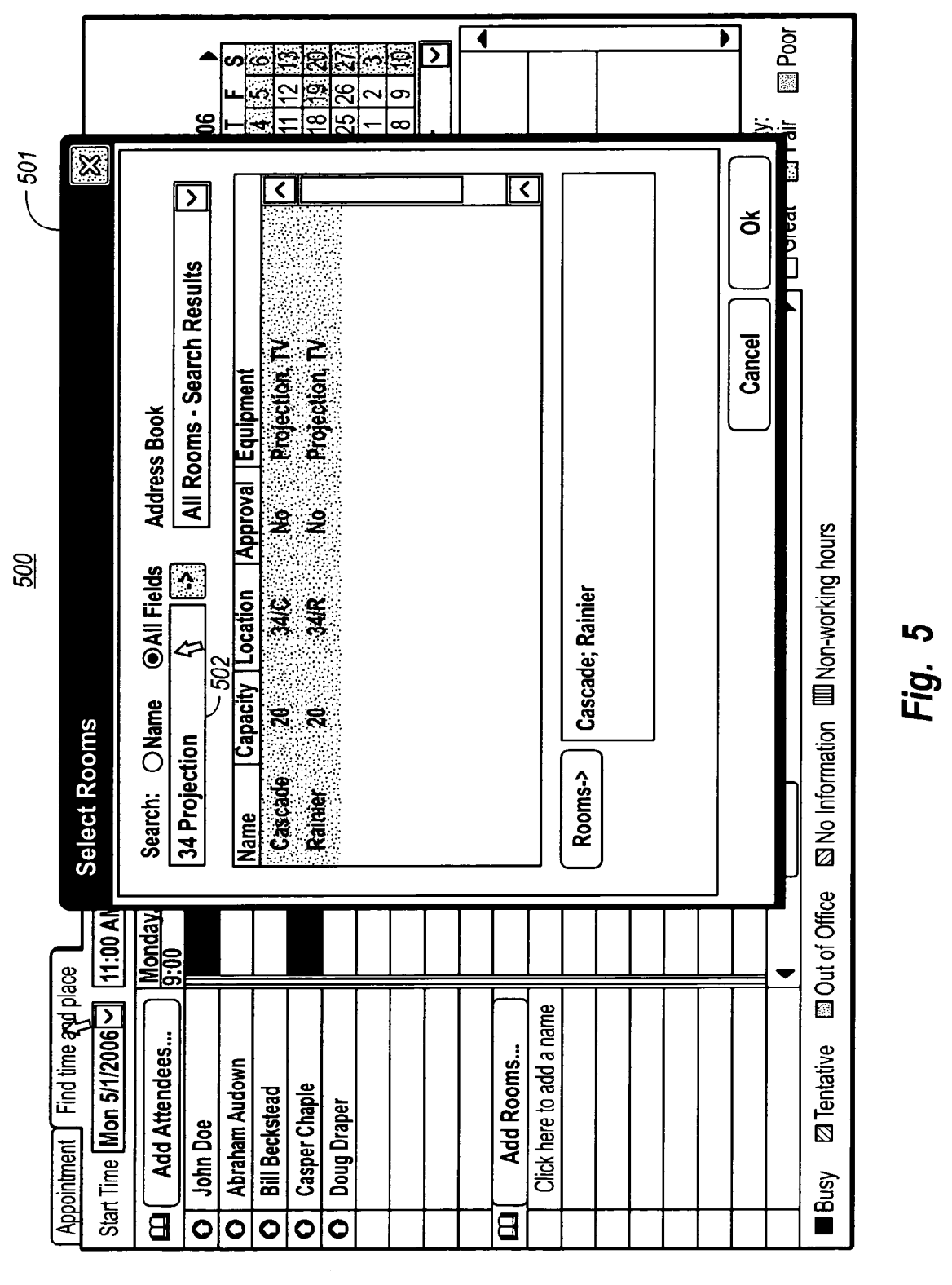
Figure 6:
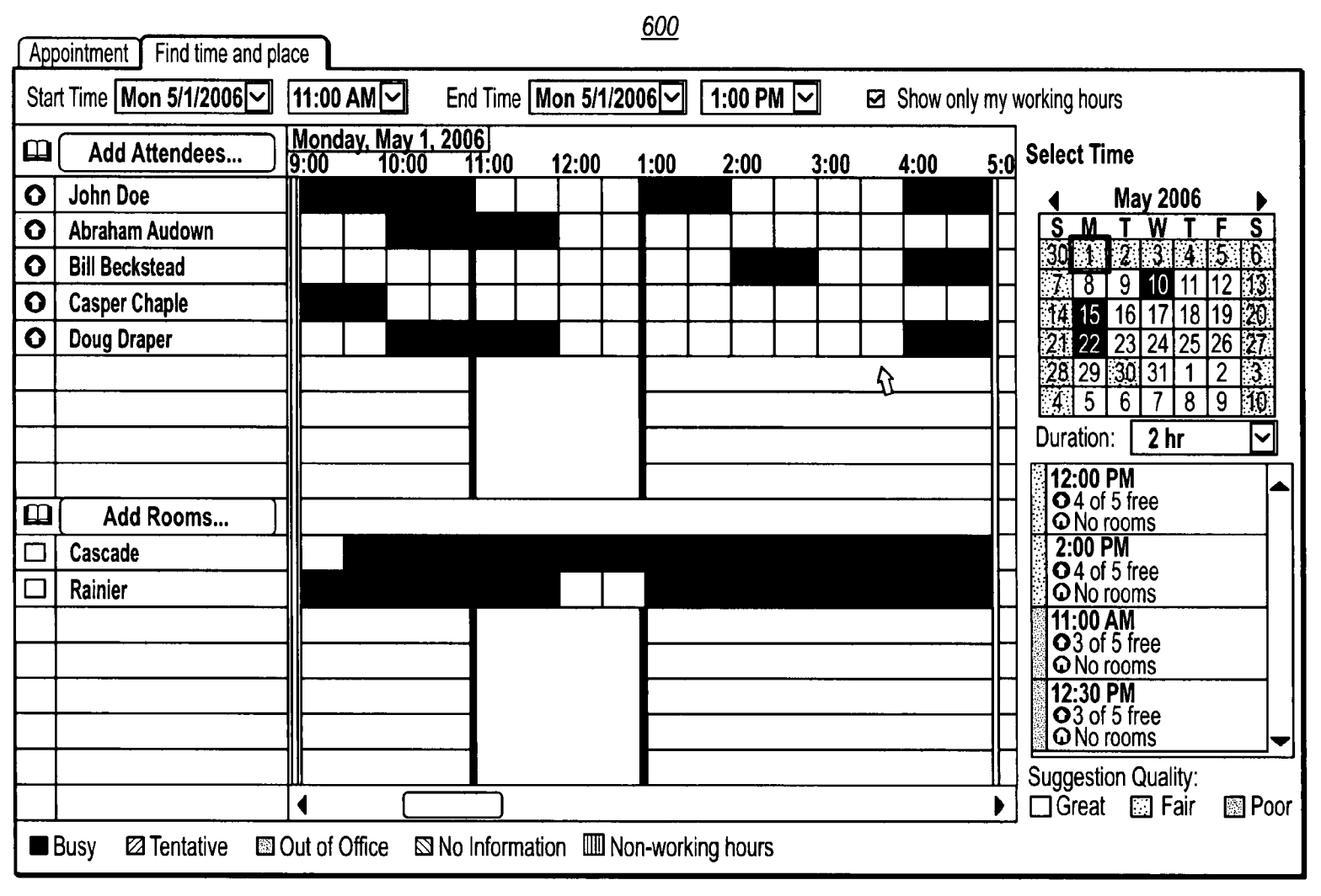

FIG. 6 shows a similar user interface 600, only after the four attendees of FIG. 4 and the two rooms of FIG. 5 have been added. Here, the free busy data is much more congested. This scenario would typically require extensive manual searching for the user scheduling the meeting. Here, however, the user can simply view the suggestions, and note there are no "great" options for the meeting, but two fair options for the meeting. The best option is perhaps the top option in which 4 of the 5 required attendees can attend, but in which there are none of the two requested rooms available. Since the best option is only categorized as "fair" for May 1, 2006, the whole day is categorized as just "fair".

Referring to the date picker frame, May 1 is visually highlighted as fair. May $2^{nd}$ through $7^{th}$, May $11^{th}$ through $14^{th}$, May $19^{th}$ through $21^{st}$, May $27^{th}$, May $28^{th}$, and May $30^{th}$ are just fair for the meeting. There are even three days that are categorized as "poor" for the meeting including May $10^{th}$, $15^{th}$ and $22^{nd}$. If the options for May $1^{st}$ are not satisfactory to the user, the user can quickly view other more attractive days for the meeting.

Figure 7:
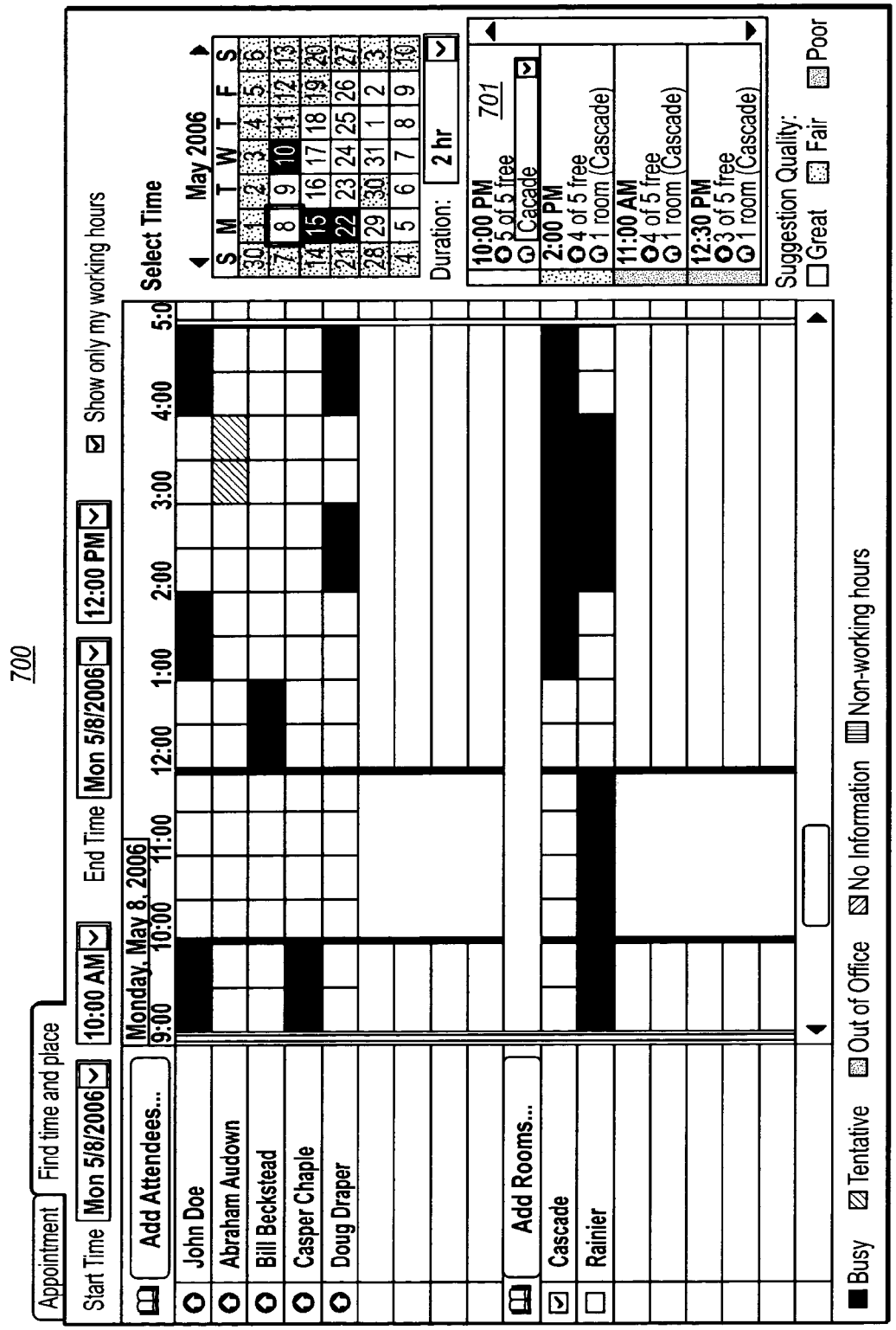
FIG. 7 illustrates a user interface that may be displayed if a different day is selected.

Referring to FIG. 7 is a user interface 700 that would appear if May $8^{th}$ were selected. The user may have been induced to that day since it is the next day after May $1^{st}$ that is white, indicating a great day for the meeting. Viewing the suggested meeting times, there is an option at 10:00 am in which there is a room available "Cascade" and in which all five required attendees are available. In our example, the user decides that this is the best option for the meeting.

Figure 2B:
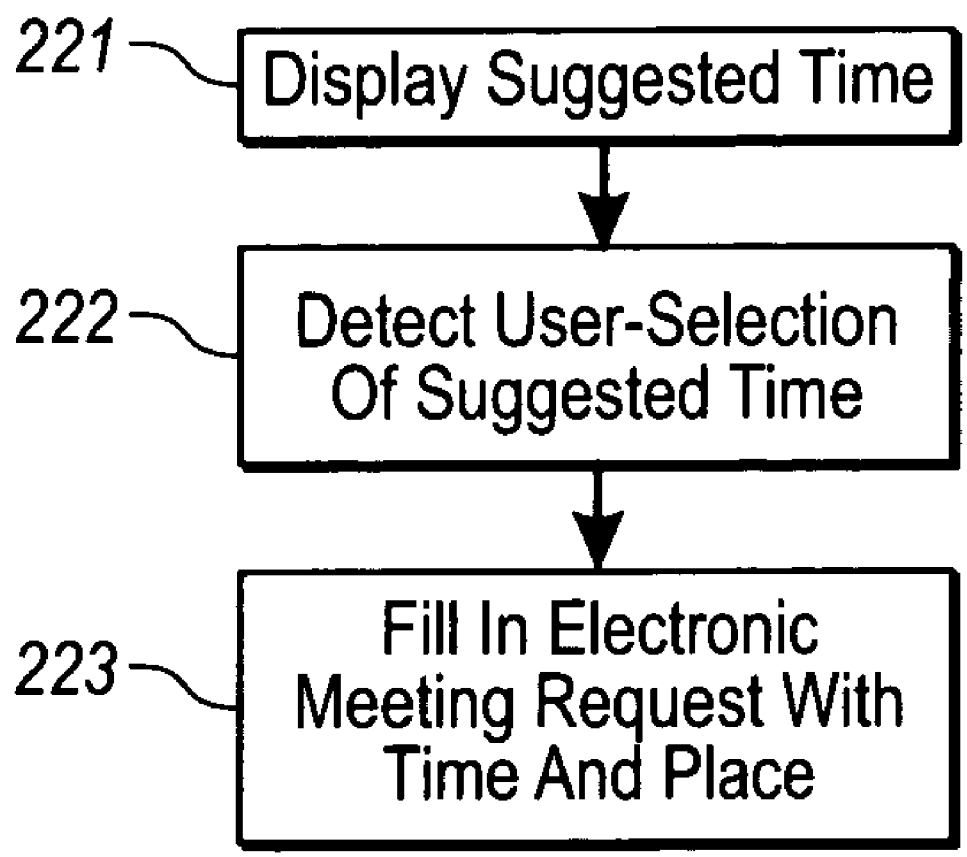
FIG. 2B illustrates a method for automatically generating an electronic meeting request in accordance with the principles of the present invention.

FIG. 2B illustrates a method 200B for automatically generating an electronic meeting request. The method comprises displaying an identification of a suggested meeting time for a meeting (act 221). Referring to FIG. 7, this could be suggested meeting time 701. The computing system then detects that a user has used a user input device to select the suggested meeting time (act 222). For instance, the user may use a mouse or pointer to select suggested meeting time 701. Then, the computing system automatically fills in an electronic meeting request with the time, attendees, and the at least one resource (such as a room) for the selected meeting time. Referring to FIG. 8, a user interface 800 appears when the user selects the suggested meeting time 701. The computing system automatically places the required attendees in the "To" field, and places the selected room in the "Location" field. The Start and End time for the chosen time is also filled in automatically. Accordingly, the electronic meeting time is substantially complete upon selecting the suggested time in FIG. 7.

Therefore, the principles of the present invention provide an intuitive way to schedule a meeting, and permits for efficient scheduling even for busy meeting attendee and room schedules. The principles of the present invention also permit for rapid filling in of the electronic meeting request, and permits access to the raw free busy data for more refined control over scheduling when desired.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for assisting in the scheduling of a meeting, the method comprising:
   an act of receiving one or more meeting parameters from a computer user;
   an act of automatically evaluating a plurality of possible meeting times using the received user-provided meeting parameters against a predetermined set of suitability criteria including the following: each attendee's raw free-busy data, the number of required attendees who have a conflict at a particular time, an indication of whether the conflict is due to a tentative appointment, a busy entry, or an out of office entry, an indication of whether the conflict is only a partial conflict where the conflict is only during a portion of the particular time, the number of rooms available, an indication of whether one or more requested resources are available, the number of optional attendees having a conflict, an indication of whether the particular time begins on the hour or at another point before or after the hour mark and an indication of whether the particular time is partially or totally out of normal working hours;
   an act of automatically identifying a plurality of suitable, suggested meeting times based on the evaluation of the suitability criteria, wherein each of the suitable, suggested meeting times is determined to be suitable based on at least one of the suitability criteria;
   an act of computer calculating a desirability rating only for those meeting times determined to be suitable based on at least one of the suitability criteria, the desirability rating comprising a further calculation that is determined based on each meeting time's overall level of compliance with each of the suitability criteria, wherein the identified suitable suggested meeting times have varying levels of desirability based on the further desirability rating calculation, such that meetings are capable of being determined to be suitable but not desirable, wherein the desirability rating is evaluated using a calculated sum of weighted conflicts corresponding to each desired meeting attendee, wherein the sum is generated by adding the combined weighting of those meeting attendees that are required to attend the meeting and the required attendee conflict is weighted according to the duration of the overlap of the attendee's conflict;
   an act of outputting to the same application window both the raw busy-free data for each attendee including an indication of suggested meeting times, which rooms are available at each time and how many desired attendees are available at each time based on a set of input criteria for each of at least some of the suggested meeting times, and, in the same application window and in addition to the raw busy-free data, a separate suggestion quality graphical indicator for each of the displayed suggested meeting times, the suggestion quality indicator comprising one of a plurality of different graphical indicators, each graphical indicator corresponding to the evaluated desirability rating for each suggested meeting time, the suggestion quality visual indicators being combined into a calendar month view configured to show a plurality of different indicators, wherein each indicator is associated with a corresponding day of the month;
   an act of receiving a subsequent input indicating from a computer user indicating one or more changes that are to be made to the meeting parameters; and
   an act of updating the display output such that the display output reflects the received changes to the meeting parameters as well as one or more updated suggested possible meeting times and corresponding updated desirability rating for each of the suggested meeting times.

2. A computer-implemented method in accordance with claim 1,
   wherein the act of automatically evaluating the plurality of possible meeting times comprises an act of calculating a desirability rating for each of the plurality of possible meeting times as a function of the predetermined set of suitability criteria, and
   wherein the act of automatically identifying a plurality of suggested meeting times based on the evaluation comprises an act of identifying the plurality of possible meeting times that have a rating indicative of a suitable meeting time as being suggested.

3. A computer-implemented method in accordance with claim 2, wherein the act of identifying the plurality of possible meeting times that have a rating indicative of a suitable meeting time as being suggested comprises:
   an act of categorizing the plurality of possible meeting times into one of a plurality of categorizations, wherein each possible meeting time that falls within a particular range of ratings is assigned to a particular categorization corresponding to the particular range; and
   an act of identifying all possible meeting times as being suggested based on their categorization.

4. A computer-implemented method in accordance with claim 1, wherein the indication of desirability includes a number of conflicts associated with the suggested meeting time, wherein the number of conflicts may be a positive integer.

5. A computer-implemented method in accordance with claim 4, wherein the indication of desirability includes a number of rooms available for the suggested meeting time.

6. A computer-implemented method in accordance with claim 1, further comprising:
   an act of outputting an indication of suitability for a day corresponding to each of a plurality of days corresponding to a range of days that contains all of the plurality of possible meeting times.

7. A computer-implemented method in accordance with claim 1, wherein the meeting parameters include an identification of the attendees, one or more possible meeting places, and a duration.

8. A computer-implemented method in accordance with claim 7, wherein the meeting parameters further include whether or not each identified attendee is mandatory or optional.

9. A computer-implemented method in accordance with claim 1, wherein the predetermined set of suitability criteria includes, a number of the attendees with a conflict and the extent of the conflict.

10. In a computing system that includes a display, a method for facilitating intuitive scheduling of a meeting, the method comprising:
   an act of evaluating a plurality of possible meeting times using the received user-provided meeting parameters against a predetermined set of suitability criteria including the following: each attendee's raw free-busy data, the number of required attendees who have a conflict at a particular time, an indication of whether the conflict is due to a tentative appointment, a busy entry, or an out of office entry, an indication of whether the conflict is only a partial conflict where the conflict is only during a portion of the particular time, the number of rooms available, an indication of whether one or more requested resources are available, the number of optional attendees having a conflict, an indication of whether the particular time begins on the hour or at another point before or after the hour mark and an indication of whether the particular time is partially or totally out of normal working hours;

an act of the computing system accessing a plurality of suitable, suggested meeting times for the meeting that is to be scheduled, wherein the suggested meeting times are based on the evaluation of the suitability criteria, wherein each of the suitable, suggested meeting times is determined to be suitable based on at least one of the suitability criteria;

an act of the computing system calculating a desirability rating only for those meeting times determined to be suitable based on at least one of the suitability criteria, the desirability rating comprising a further calculation that is determined based on each meeting time's overall level of compliance with each of the suitability criteria, wherein the identified suitable suggested meeting times have varying levels of desirability based on the further desirability rating calculation, such that meetings are capable of being determined to be suitable but not desirable, wherein the desirability rating is evaluated using a calculated sum of weighted conflicts corresponding to each desired meeting attendee, wherein the sum is generated by adding the combined weighting of those meeting attendees that are required to attend the meeting and the required attendee conflict is weighted according to the duration of the overlap of the attendee's conflict;

an act of accessing the calculated desirability rating for each of the plurality of suggested meeting times, wherein the plurality of suggested meeting times and the calculated desirability rating for each suggested meeting time are computer-generated;

an act of displaying in the same application window both the raw busy-free data for each attendee including an identification of a time, which rooms are available at that time and how many desired attendees are available at that time based on a set of input criteria for each of at least some of the suggested meeting times, and, in the same application window and in addition to the raw busy-free data, a separate suggestion quality visual indicator for each of the displayed suggested meeting times, the suggestion quality indicator comprising one of a plurality of different indicators, each indicator corresponding to the evaluated desirability rating for each suggested meeting time, the suggestion quality visual indicators being combined into a calendar month view configured to show a plurality of different indicators, wherein each indicator is associated with a corresponding day of the month;

an act of receiving a subsequent input indicating from a computer user indicating one or more changes that are to be made to the meeting parameters; and an act of updating the output of the display such that the display output reflects the received changes to the meeting parameters as well as one or more updated suggested possible meeting times and corresponding updated desirability rating for each of the suggested meeting times.

11. A method in accordance with claim 10, further comprising:

an act of the computing system detecting user-inputted constraints for the meeting prior to accessing the plurality of suggested meeting times.

12. A method in accordance with claim 10, wherein the visual indicator is a visual highlighting.

13. A method in accordance with claim 10, wherein at least one of the following is displayed for each of the displayed suggested meeting times:

a number of conflicts associated with the suggested meeting time, wherein the number of conflicts may be a positive integer; and a number of rooms available for the suggested meeting time.

14. A method in accordance with claim 10, further comprising:

an act of causing the display to display calendar; and an act of attaching a visual indicator to each of a plurality of days in the calendar, the visual indicator for each day representing a suitability of each day for the meeting.

15. A method in accordance with claim 14, further comprising:

an act of detecting that a user has selected one of the plurality of days in the calendar, wherein the act of causing the display to display an identification of a time for each of at least some of the suggested meeting times comprises an act of causing the display to display an identification of a time for one or more suggested meeting times that are within the selected day.

16. The method of claim 10, wherein the desirability rating includes as factors at least one of a maximum inconvenience factor for a given required attendee and a total inconvenience factor across all required attendees.

17. In a computing system that includes a display, a method for facilitating intuitive scheduling of a meeting, the method comprising:

an act of evaluating a plurality of possible meeting times using one or more accessed meeting parameters against a predetermined set of input criteria including the following: each attendee's raw free-busy data, the number of required attendees who have a conflict at a particular time, an indication of whether the conflict is due to a tentative appointment, a busy entry, or an out of office entry, an indication of whether the conflict is only a partial conflict where the conflict is only during a portion of the particular time, the number of rooms available, an indication of whether one or more requested resources are available, the number of optional attendees having a conflict, an indication of whether the particular time begins on the hour or at another point before or after the hour mark and an indication of whether the particular time is partially or totally out of normal working hours, the evaluation result including an evaluated desirability rating, the rating including a plurality of different desirability levels for display in conjunction with a meeting time, wherein the desirability rating is generated by identifying a plurality of suitable, suggested meeting times based on the evaluation of the suitability criteria, wherein each of the suitable, suggested meeting times is determined to be suitable based on at least one of the suitability criteria and calculating the desirability rating only for those meeting times determined to be suitable based on at least one of the suitability criteria, the desirability rating comprising a further calculation that is determined based on each meeting time's overall level of compliance with each of the suitability criteria, wherein the identified suitable suggested meeting times have varying levels of desirability based on the further desirability rating calculation, such that meetings are capable of being determined to be suitable but not desirable, wherein the desirability rating is evaluated using a calculated sum of weighted conflicts corresponding to each desired meeting attendee, wherein the sum is generated by adding the combined weighting of those meeting attendees that are required to attend the meeting and the required attendee conflict is weighted according to the duration of the overlap of the attendee's conflict;

an act of the computing system accessing a plurality of suggested meeting times for the meeting that is to be scheduled, and accessing the evaluated desirability rating for each of the plurality of suggested meeting times, wherein the plurality of suggested meeting times and the evaluated desirability rating for each suggested meeting time are computer-generated and are based on a combination of the number of invited meeting participants that are able to attend at that time, the number of rooms available at that time and which requested resources are available at that time;

an act of displaying in a first portion of an application window the raw busy-free data for each attendee an identification of a time, which rooms are available at that time and how many invited attendees are available at that time based on a set of input criteria for each of at least some of the suggested meeting times, and, in the second portion of the application window, a separate suggestion quality visual indicator for each of the displayed suggested meeting times, the suggestion quality indicator comprising one of a plurality of different visual indicators, each indicator corresponding to the evaluated desirability rating for each suggested meeting time, the suggestion quality visual indicators being combined into a calendar month view configured to show a plurality of different indicators, wherein each indicator is associated with a corresponding day of the month;

an act of receiving a subsequent input indicating from a computer user indicating one or more changes that are to be made to the meeting parameters; and an act of updating the output of the display such that the display output reflects the received changes to the meeting parameters as well as one or more updated suggested possible meeting times and corresponding updated desirability: rating for each of the suggested meeting times.

* * * * *